SILICON JUNCTION DIODE

Filed June 13, 1955

LEONID FEDOTOWSKY
AND
HOWARD W. MARSH
INVENTORS

BY
Connolly and Hutz
THEIR ATTORNEYS

United States Patent Office 2,906,932

Patented Sept. 29, 1959

2,906,932

SILICON JUNCTION DIODE

Leonid Fedotowsky, North Adams, and Howard W. Marsh, Lenox, Mass., assignors to Sprague Electric Company, North Adams, Mass., a corporation of Massachusetts Application June 13, 1955, Serial No. 515,175

9 Claims. (Cl. 317—240)

This invention relates to a structure and method of producing a silicon diode, and more particularly to a structure and method of producing a junction alloy silicon diode.

Among the important electrical properties of a junction alloy diode or a welded diode, as it may also be called, are its interdependent spreading resistance and its forward current. Other important properties include its power or heat dissipating ability and recovery time.

These properties are dependent upon various characteristics of the diode including its structural configuration and method of production. The method of alloying or welding the electrodes to the semiconductor affects these properties. A factor which affects alloying is the formation of an oxide coating on commonly used aluminum acceptor-type electrodes. Such constructions dispose the rectifying and non-rectifying electrodes adjacent to others on the same surface of the silicon crystal.

An object of this invention is to provide a structure for a junction alloy silicon diode and its component parts, which structure enhances its operating characteristics and heat dissipating ability.

Another object of this invention is to provide a method and structure for preventing the formation of oxide films on aluminum electrodes used in junction alloy diodes.

A further object is to produce a hermetically sealed silicon junction diode which will satisfactorily operate over an extended temperature range.

In accordance with this invention, a junction alloy diode is constructed in the following manner. A pair of electrodes are alloyed to opposite faces of a thin silicon crystal of n-type conductivity in a coaxial fashion. One electrode of aluminum, provided with a thin protective metal coating, is alloyed to a surface of the silicon crystal so as to produce a fused p-n junction. The other electrode in sheet form is of gold alloyed to the opposite surface of the silicon crystal to provide a base or ohmic contact. The separation between the p-n junction and the ohmic gold-silicon alloy region must be of about 5 mils or less to obtain the improved electrical characteristics of the device.

The aluminum electrode generally in the form of a wire alloyed with the silicon to produce the p-region of the diode is coated with a protective layer of a metal such as gold, tin and indium so as to prevent surface oxidation. An oxide coating has proven a substantial detriment to proper alloying of aluminum to silicon; the unmelted oxide covering mechanically impedes the alloying process, as well as allowing molten aluminum to migrate through fractures in the coating so as to create voids. The use of the term aluminum includes alloys such as aluminum-tin and aluminum-indium.

This protective coating must be applied directly to the aluminum after the aluminum oxide film has been removed and before it can reform. It may be applied by means of an ultrasonic soldering process where the oxide is ripped off in a metallic melt while the aluminum is being tinned, or a noble metal such as gold or silver may be electroplated upon an intermediate coating such as zinc which can replace the aluminum oxide in an electrochemical reaction.

The process of alloying the electrodes to the semiconductor is carried out in a special manner to enhance the operating characteristics of the resulting junction. The alloy process must be carried out rapidly so as to avoid electrical degradation of the crystal. Time delay has been avoided by insuring rapid transfer of heat from the base electrode to the crystal or alternatively from the crystal to the rectifying electrode through a bridge of melt. More specifically in the process of alloying the gold ohmic contact to the silicon crystal, the gold is precoated with a thin coating of tin or other low melting point melt which functions as the bridge melt. In the aluminum-silicon alloy electrical current is passed through the aluminum wire and into the heated silicon body by a small contact region of high resistance causing a bridge melt.

The heat dissipating properties of the diode are magnified by connecting a substantial area of the crystal to the interior of the can by means of a joining material having relatively good heat conducting properties. The structure taught by the present invention makes a large area available to be so connected.

In one embodiment of a hermetically sealed diode the rectifying electrode is insulated by an insulating elastomer compound, and the remaining portion of the can is filled with a potting compound which seals the junction alloy structure within the can. This potting compound may be a filled epoxy resin which has properties well suited for this purpose.

The novel features of the present invention will become apparent to one skilled in the art from a reading of the following description in conjunction with the accompanying drawings in which:

Figs. 1 and 2 show their respective embodiments in enlarged form to more clearly illustrate the features of the present invention. Parts in Fig. 2 identical to parts in Fig. 1 are designated by the same reference characters followed by the suffix (*a*).

Figures 1, 2, 3:
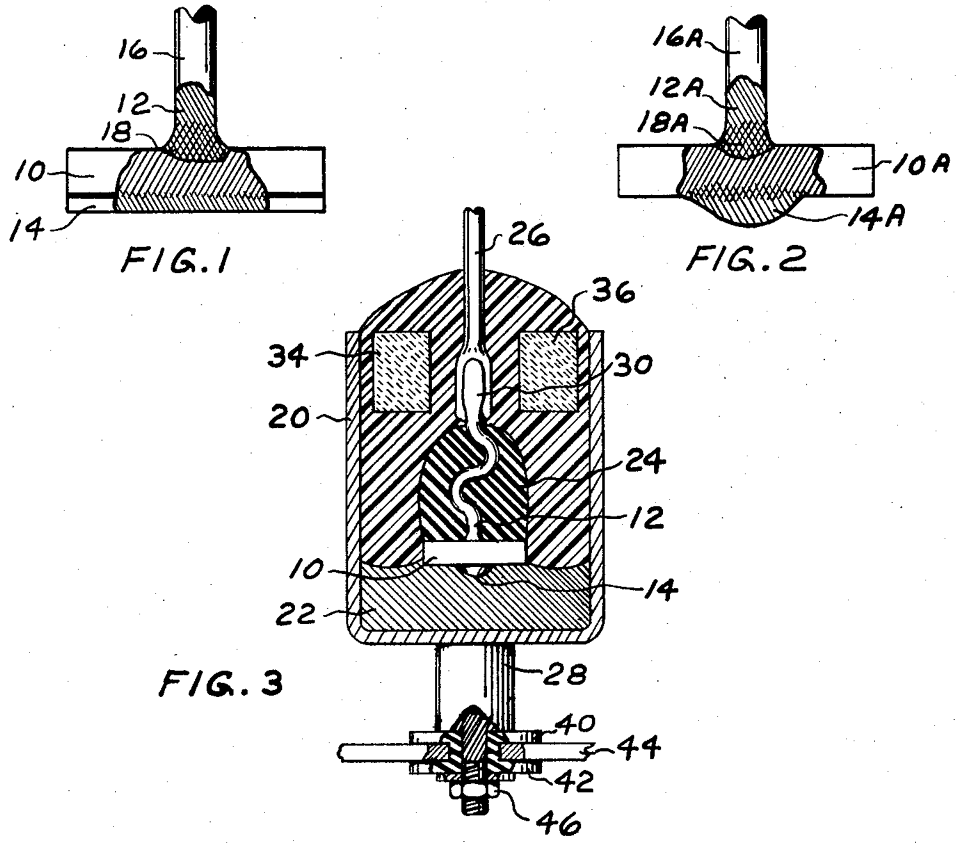
Figs. 1 and 2 are enlarged cross-sectional views in elevation of two embodiments of the silicon diode of this invention.
Fig. 3 is an enlarged cross-sectional view in elevation of the hermetically sealed diode of the invention.

In Figs. 1 and 2 the silicon crystal forming the n-conducting region of the p-n fused junction is designated by 10 and **10*a*. In each of these two embodiments the rectifying electrodes 12, 12*a* and ohmic electrodes 14, 14*a* are coaxially positioned on the opposed surfaces of the crystal. It is to be noted that the aluminum electrode 12, 12*a* has a protective coating 16, 16*a* of preferably a metal such as tin, indium and gold. The limits of the silicon-aluminum alloy region 18 is shown by the dashed lines, the lower one being the rectifying boundary p-n of the silicon diode. In the initial preparation of the silicon wafer n-impurity is added, the concentration being determined by the desired Zener breakdown voltage or in the resistivity doped silicon crystal which should be between about .01 ohm-centimeters to 60 ohm-centimeters. The point of distinction between Figs. 1 and 2 lies in the configuration of the ohmic electrode 14, 14*a*. Electrode 14 is in the form of a gold foil or sheet doped with an n-impurity as antimony, arsenic, which is alloyed with the silicon over a substantial portion of the surface. In contrast 14*a* is of much smaller area than 14, e.g. its diameter is from 2 to 5 times that of electrode 12** and has the appearance after alloying of a dimple on the silicon crystal surface. The composition of 14*a* is the same as that of 14. The latter embodiment is preferred, particularly where the device is to be used at depressed temperatures.

The disposition of the electrodes to opposite faces of the crystal in a coaxial fashion provides a relatively low spreading resistance and a concomitant relatively high forward current. Forward currents through diodes in accordance with this invention are increased by a factor value of 5–20 at one volt D.C. in comparison to currents through structures where the electrodes are not disposed on opposite faces of the crystal. As previously stated, the crystal is made extremely thin so that a minimum distance is provided between the electrodes. A one to eight mil separation, for example (with less than five mils being the preferred separation), helps provide excellent forward current characteristics.

Other advantages are also provided. As will be later demonstrated, the leads can be brought out coaxially from the diode for convenient connection to a circuit. A substantial area of the junction, particularly the base electrode portion, is available for soldering to the interior of the can to promote the heat dissipating ability of the diode.

In Fig. 3 a junction alloy diode 10 is enclosed in a metal can or capsule 20. This can is made of a metal having relatively good heat conducting properties. This can may be made of copper, iron, brass, silver, etc. The can is formed in a cup-shape having one open and one closed end.

The junction alloy structure 10 is placed within the can with the base electrode 14 disposed towards the closed end of the can. A quantity of a joining material 22 is placed within the closed end of the can to connect a substantial portion of the crystal, particularly the base electrode portion, to the interior of the can. This joining material must have relatively good heat conducting properties. It may be tin-solder, for example. This solder connects and binds the gold base electrode 14 and a substantial portion of the crystal 10 to the can. Since the major portion of the heat generated by the diode is generated at the p-n junction portion of the crystal, a path is provided for dissipating this heat from the crystal through the metal can. This greatly promotes the heat dissipating ability of the diode. The tin-solder also provides means for connecting an electrical lead to the base electrode.

The aluminum electrode 12 and the face of the crystal 10 to which it is attached are covered by a mound of elastomer insulating material 24. This insulating material 24 may be a rubber compound, silicone rubber for example. The electrode 12 has an S bend encapsulated by the elastomer 24 to prevent fracture of the alloy of the electrode 12 to the crystal 10 when cycled through the wide operational temperature range. Electrical conductor or lead 26, 28 is connected respectively to the rectifying electrode 12 and the base of the can 20. The lead 26 of nickel is crimped to the electrode 12 as indicated by their flattened junction 30. The lead 28 is simply soldered or otherwise mechanically and electrically connected to the can 20 and thus connected to the base electrode 14 through the solder 22.

The remaining portion of the can is filled with a filled potting compound 34. This potting compound is an epoxy resin, for example, Araldite which is a tradename for a resin of this type provided by the Ciba Company of 627 Greenwich Street, New York, N.Y. It has favorable properties for use as a potting compound. It is insoluble, has high chemical resistance, shrinks very little in comparison to other resins after gelation, is an extremely good adhesive and has high impact strength.

One epoxy resin is an unmodified resin of the type made by condensation of epichlorohydrin and bisphenol A. It is cured by baking with a suitable hardening agent.

For a discussion of the properties of resins of this type and their preparation, refer to an article entitled "Applications of Some Epoxide Resins in the Plastics Industry" by E. S. Narracott in the October 1951 issue of "British Plastics" on pages 341–5. Usually about 50% by weight of finely divided silica is admixed with the resin so as to reduce the temperature coefficient of expansion, although other fillers may be used.

For operation at depressed temperatures of −50° C. it is desirable to position a ceramic sleeve or annular disc 36 in the filled resin. Such an endseal for hermetically sealed electrical components is fully described in the copending United States patent application of W. C. Lamphier, Serial No. 488,329, filed February 15, 1955. Another manner of hermetically sealing the diode of the invention is by a glass-to-metal cover which is soldered or otherwise secured to the open end of the can 20. Such a cover would utilize an alloy commonly known as Kovar with a hard glass of substantially identical temperature coefficients of expansion.

In many applications it is desirable to mount the diodes to a chassis so as to firmly secure the unit. Lead 28 is shown as partially threaded for such a mounting. Insulating washers 40 and 42 are imposed on each side of the chassis or mounting board 44 and firmly secure the unit thereto by bolt 46. The lead wire can be secured to 28 by positioning under either bolt 46 or 48 or in any other manner known to the art.

The aluminum electrode 12 has a protective coating 16 on its outer surface. This protective coating adheres directly to the aluminum and prevents the formation of aluminum oxide (corundum) which would interfere with the alloying or welding process. This welding process is carried on at a temperature of approximately 900° C. and is accomplished in a short time (several seconds). An oxide coating would have a melting point of 2000° C. and, therefore, would be present in the form of a hard crust around the molten aluminum during the welding process. This crust would interfere with the proper welding of the aluminum wire. This crust might be dissolved in diluted sodium hydroxide or hydrochloric acid solutions. This dissolving process is effective only if done immediately prior to welding because the presence of water in the dissolving solution inevitably forms aluminum oxide hydrates. Electrodes prepared in this way, therefore, have to be prepared immediately before welding. In accordance with this present invention, the aluminum electrode is coated by the means of a process which removes the oxide coating and quickly replaces it before it is able to reform.

One method of quickly replacing the oxide by a coating which prevents the oxide from reforming is ultrasonic soldering or tinning. In this process ultrasonic waves set up in a tin plating bath rip off the oxide coating while tin is being deposited on the aluminum. This protects the aluminum from subsequent oxidation. For a description of this process, refer to an article by E. A. Neppiras entitled "Ultrasonic Soldering" in "Metal Industry," a British weekly publication, issue of August 8, 1952, pages 103–106. When desired, indium can be used because of its unique wetting characteristics. When protective metal coatings of relatively low melting points as tin and indium are used, they have the further advantage of assisting in the formation of the bridge melt.

Another method of coating the aluminum is to electroplate an outer coating of a noble metal, such as gold, upon an inner coating of a metal such as zinc which can replace aluminum oxide as by dipping the oxide-coated aluminum in an aqueous acid solution of zinc chloride or other zinc salt. A concentration of 5 to 20% zinc salt is satisfactory. Excess free acid such as 1 to 20% hydrochloric acid by weight can also be present. If desired, the oxide-coated aluminum can also be cathodically treated in such an electrolyte to cause zinc or other metal to be directly deposited on the aluminum as the oxide film is attacked. Furthermore, the zinc-coated aluminum can be used without further plating.

Electrodes protected in this way can be stored indefinitely before welding. In addition, the electrodes are more ductile and do not show surface cracks during the welding process. The coating in no way interferes with the electrical properties of the diode. Good electrical contact to the lead wire is also facilitated by these coatings. This contact may be easily secured by crimping the aluminum electrode to the lead wire, soldering or welding.

Of all the protective metal coatings above, gold is the least preferred because of the property of readily alloying with silicon. If gold is used, the coating should be of a minimum thickness which will prevent oxidation of the aluminum electrode wire. Gold has been taught to be used for welded contacts for germanium diodes, but with silicon it has an inherent disadvantage. Should an appreciable amount of gold diffuse into the aluminum-silicon alloy, it serves to trap the electrons in the p-region extending the recovery time. The silicon diode of the invention has a recovery time approaching one microsecond in contrast to one second for gold bonded diodes.

Figure 4:
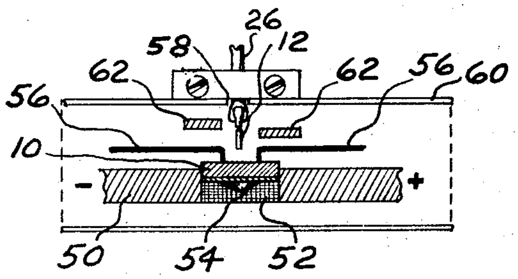
Fig. 4 is a cross-sectional view of the apparatus for fabrication of an alloyed junction silicon diode.

In the alloying process the rectifying and base electrodes 12 and 14 are brought into contact with the semiconductor crystal 10 by such an apparatus as shown in Fig. 4. Thus in producing this silicon diode a silicon crystal of 50 mils by 50 mils by 12 mils thickness having a resistivity range as desired, is placed on the heater strip 50 of nichrome which has a center region of carbon 52, which carbon is desirable as it prevents sticking of the gold or gold alloy to the metal. Prior to placing the crystal upon the heater strip a tin plated gold sheet of approximately 2 mils thickness is placed upon the carbon and the tin plating of approximately .2 mil thickness serves as the melt bridge for rapid transfer of the heat from the nichrome and carbon to the crystal. In the fabrication of the construction of Fig. 2 the carbon square 52 will have a central depression 54 which allows the gold upon melting to accumulate there so as to produce the alloyed area and extending dimple upon the lower surface of the silicon crystal. During the fabrication of the silicon diode pins 56 are pressed down upon the upper surface of the silicon crystal so as to facilitate heat transfer from the Nichrome strip 50 to the region of the aluminum-silicon alloy weld. The surface protected aluminum wire 12 joined to electrode 26 passes through an opening 58 into the volume defined by the housing 60. During the fabrication operation the atmosphere within the housing is of an inert gas, for example, argon, so as to prevent any oxidation of the aluminum during the alloying process with the silicon. Prior to positioning the aluminum wire 12 on the surface of the silicon, two cooperating knives, both of which are shown as 62, come together to cut the exposed end of the aluminum wire 12 so as to present a non-oxidized surface suitable for melting. Thereafter the aluminum wire is positioned on the surface of the silicon crystal 10. The production of the p-conductivity range, that is the aluminum-silicon alloy, is obtained by heating the silicon crystal 10 for about two seconds to a temperature of about 900° C. by passing currents through the Nichrome heater strip 50, thereafter sending a current pulse of one-half second to one second duration through the aluminum wire 12 and into the crystal 10 so as to produce the bridge melt so that the heat from the crystal 10 can be readily transferred to the aluminum wire 12. The heating cycle continues for one to two-and-one-half seconds additional time after which the currents of the Nichrome heater strip are stopped and the entire crystal allowed to cool for 20 to 30 seconds. The silicon-gold alloy was obtained by passing current through the heater strip for several seconds resulting in a temperature of about 600° C. during which time the alloying occurs, which is an integral part of the foregoing fabrication cycle of the aluminum-silicon alloy. The assembled structure is heated at approximately 900° C. for several seconds.

Other potting compounds can also be used in place of the silicone or epoxy resins. Thermosetting potting resins of any kind such as cross-linked polyesters of ethylene glycol and maleic acid, or copolymers of styrene and divinyl benzene are particularly effective. Other resins such as poly n-vinyl carbazole are suitable.

Although tin solders such as alloys of lead containing about 20 to 60% tin are very effective for increasing the heat dissipation, other solders such as tin-zinc solders, lead-silver solders, and even silver solders or brazing compounds can be used if desired. In each case the can should be of material readily wetted and bonded by the solder. Most solders and brazing compounds will adhere very well to cans made of copper or brass, aluminum cans can be used with the usual tin-zinc type of aluminum solder.

Although it has been stated that the resistivity of the end-type silicon crystal should be between the ranges of 0.1 and about 60 ohm-centimeters, it has been found that that it is possible to produce rectification of small signals, that is, signals of an amplitude of less than ½ volt by modification of the resistivity of the crystal. By using a heavily doped silicon crystal, which doping is done with a donor impurity to obtain the resistivity in the order of 0.002 to about 0.003 ohm-centimeters with the diode construction of the invention, the bending point of the current voltage curve has been found to pass through substantially zero voltage. This phenomena may perhaps be explained by the extremely high space charge change at the p–n junction due to the high impurity concentration of the low resistivity silicon crystal. This space charge generates an inner electric field across the junction of such high intensity that an electric breakdown is caused even if no external voltage is applied to the p–n junction. Thus a slight external voltage in reverse direction causes an appreciable flow of current. Hence by appropriate change in polarity of the device it is possible to use this type of construction for amplitudes smaller than one-half volt which extends its operational range.

As many apparently widely different embodiments of this invention may be made without departing from the spirit and scope hereof, it is to be understood that the invention is not limited to the specific embodiments hereof except as defined in the appended claims.

What is claimed is:

1. A junction diode comprising a doped silicon crystal of n-conductivity having coaxially disposed electrodes, one of said electrodes comprising aluminum and alloyed with said silicon crystal to produce a region of p-conductivity, the other of said electrodes consisting of gold alloyed to the silicon, the separation of the p–n junction and the gold silicon alloy being of less than about five mils.

2. The diode of claim 1 in which the diameter of the silicon gold alloy is from about two to about five times the diameter of the aluminum electrode.

3. The diode of claim 1 wherein the aluminum electrode is coated with a protective metal layer.

4. The diode of claim 1 wherein the resistivity of the silicon crystal is from about .01 to about 60 ohm-centimeters.

5. The diode of claim 1 having the gold electrode and a substantial part of the crystal positioned in a heat conducting metallic contact.

6. A junction alloy diode comprising a silicon semiconductor crystal, a pair of electrodes alloyed to opposite faces of said crystal, a can formed of a relatively good heat conducting material, said crystal and alloyed electrodes being enclosed within said can, a joining material having relatively good heat conducting properties electrically connecting one of said electrodes and a substantial area of said crystal with the interior of said can, an electrical lead connected to the other of said electrodes, an elastomer insulating material surrounding said other electrode and face of said crystal, and a potting substance filling the remaining portion of said can.

7. The invention comprising the combination set forth in claim 6 wherein one of said electrodes is a rectifying electrode and the other of said electrodes is a base electrode, said base electrode being in sheet form and being alloyed to the face of said crystal to form a flat base structure.

8. The invention comprising the combination set forth in claim 7 wherein said base electrode is comprised of gold foil doped with n-type impurities.

9. The diode of claim 1 wherein the resistivity of the silicon crystal is modified by donor doping to obtain resistivities of from about 0.002 to about 0.003 ohm-centimeters.

References Cited in the file of this patent

UNITED STATES PATENTS

| | | |
|---|---|---|
| 2,644,852 | Dunlap | July 7, 1953 |
| 2,654,059 | Shockley | Sept. 29, 1953 |
| 2,725,505 | Webster et al. | Nov. 29, 1955 |
| 2,735,050 | Armstrong | Feb. 14, 1956 |
| 2,736,847 | Barnes | Feb. 28, 1956 |
| 2,757,324 | Pearson | July 31, 1956 |
| 2,809,332 | Sherwood | Oct. 8, 1957 |